United States Patent
Park

(10) Patent No.: US 10,549,779 B2
(45) Date of Patent: Feb. 4, 2020

(54) VEHICLE CONTROL DEVICE MOUNTED ON VEHICLE AND METHOD FOR CONTROLLING VEHICLE

(71) Applicant: LG Electronics Inc., Seoul (KR)

(72) Inventor: Minsick Park, Seoul (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 15/888,741

(22) Filed: Feb. 5, 2018

(65) Prior Publication Data

US 2019/0077455 A1 Mar. 14, 2019

(30) Foreign Application Priority Data

Sep. 12, 2017 (KR) .................... 10-2017-0116762

(51) Int. Cl.
| | |
|---|---|
| *B60R 16/037* | (2006.01) |
| *B62D 15/02* | (2006.01) |
| *B60W 40/08* | (2012.01) |
| *B62D 1/181* | (2006.01) |
| *B60R 16/023* | (2006.01) |
| *G06F 21/32* | (2013.01) |
| *B62D 1/18* | (2006.01) |
| *B60N 2/24* | (2006.01) |
| *G06K 9/00* | (2006.01) |
| *G05D 1/00* | (2006.01) |

(Continued)

(52) U.S. Cl.
CPC ............ *B62D 15/025* (2013.01); *B60K 35/00* (2013.01); *B60N 2/24* (2013.01); *B62D 1/18* (2013.01); *G05D 1/0061* (2013.01); *G06F 21/32* (2013.01); *G06K 9/00288* (2013.01); *B60K 2370/21* (2019.05); *B60W 2540/26* (2013.01); *B60W 2540/28* (2013.01)

(58) Field of Classification Search
CPC ........ B62D 15/025; B62D 1/18; B62D 1/181; B60K 35/00; B60K 2370/21; B60N 2/24; G05D 1/0061; G06F 21/32; G06K 21/32; B60W 2540/26; B60W 2540/28
USPC .......................................................... 701/49
See application file for complete search history.

(56) References Cited

U.S. PATENT DOCUMENTS

| | | | | |
|---|---|---|---|---|
| 2011/0121960 A1* | 5/2011 | Tsai | ................. | B60K 28/06 |
| | | | | 340/439 |
| 2016/0107574 A1* | 4/2016 | Voelkel | ................. | B60R 1/00 |
| | | | | 348/148 |

FOREIGN PATENT DOCUMENTS

| | | |
|---|---|---|
| DE | 102006032769 | 1/2008 |
| DE | 102016002289 | 8/2016 |

(Continued)

OTHER PUBLICATIONS

European Extended Search Report in European Application No. 18160945.4, dated Oct. 25, 2018, 12 pages.

*Primary Examiner* — Marthe Y Marc-Coleman

(74) *Attorney, Agent, or Firm* — Fish & Richardson P.C.

(57) ABSTRACT

Provided are a vehicle control device provided in a vehicle and a method for controlling a vehicle. The vehicle control device for controlling a vehicle having a camera and a steering wheel includes a communication unit communicating with at least one of the camera and the steering wheel, and a controller transmitting, when a predetermined condition is met, a driving command to a driving unit which applies an external force to move the steering wheel along a predetermined route, receiving a photographed image from the camera while the steering wheel is moving, and performing authentication of a driver's face using the image.

16 Claims, 14 Drawing Sheets

(51) Int. Cl.
*B60K 35/00* (2006.01)
*B60W 50/14* (2012.01)
*B60W 40/02* (2006.01)
*B60W 10/20* (2006.01)

(56) References Cited

FOREIGN PATENT DOCUMENTS

| | | |
|---|---|---|
| JP | S60157963 | 8/1985 |
| JP | 2005157648 | 6/2005 |
| JP | 2010225089 | 10/2010 |
| JP | 2011170593 | 9/2011 |
| WO | WO2005032895 | 4/2005 |
| WO | WO2018009123 | 1/2016 |

* cited by examiner

VEHICLE CONTROL DEVICE MOUNTED ON VEHICLE AND METHOD FOR CONTROLLING VEHICLE

CROSS-REFERENCE TO RELATED APPLICATION

Pursuant to 35 U.S.C. § 119(a), this application claims the benefit of earlier filing date and right of priority to Korean Application No. 10-2017-0116762, filed on Sep. 12, 2017, the contents of which is incorporated by reference herein in its entirety.

BACKGROUND OF THE INVENTION

1. Field of the Invention

The present disclosure relates to a vehicle control device mounted on a vehicle and a method for controlling a vehicle.

2. Background of the Invention

A vehicle is an apparatus allowing a user who gets therein to move in a desired direction. Such a vehicle may be typically an automobile, for example.

Meanwhile, for convenience of a user who uses a vehicle, various sensors and electronic devices are provided. In particular, for driving convenience of a user, research into an advanced driver assistance system (ADAS) has been actively conducted. In addition, autonomous vehicles have been actively developed.

As the ADAS has been actively developed, the necessity to develop a technique capable of maximizing user convenience and safety in driving a vehicle has emerged.

Thus, a driver face authentication and status monitoring (DSM) system or a driver monitoring system has come to prominence.

The DSM is a system for identifying a driver and automatically setting a convenience device, a seat position, and the like, according to driver's preference. Also, the DSM monitors a direction of driver's eyes and blinking of the driver's eyes using an infrared camera, LED lighting, or the like, to determine an inattentive driving situation such as driving while drowsy, and the like, and warning the driver.

According to the DSM system, an infrared camera positioned above a steering to column senses a driver's face and continuously monitors the driver's eyes and movement of the driver's head in order to determine a fatigue situation of the driver, whether the driver keeps an eye on a road in a dangerous situation, and the like.

Also, the DSM system is connected to the ADAS, and if the driver dozes or keeps his eyes on another place in spite of the risk of an accident, the DSM system illuminates lighting on the driver's face or operates flash of light to help the driver concentrate on the road by instinct.

Meanwhile, conventionally, the driver monitoring camera is installed within a vehicle, but installation of the driver monitoring camera within a vehicle is considered to spoil aesthetic beauty within the vehicle so a recent trend is that the driver monitoring camera is installed not to be seen within a cluster.

In this case, however, the driver's face is covered by a steering wheel, making it difficult to authenticate the driver's face, perform monitoring, and implement a three-dimensional (3D) stereoscopic cluster function.

SUMMARY OF THE INVENTION

Therefore, an aspect of the detailed description is to solve the aforementioned problems and other problems.

Another aspect of the detailed description is to provide a vehicle control device capable of authenticating a driver through an image captured during movement of a steering wheel and calculating an optimal position of the steering wheel for detecting a driver's face, and a method for controlling a vehicle.

To achieve these and other advantages and in accordance with the purpose of this specification, as embodied and broadly described herein, a vehicle control device for controlling a vehicle having a camera and a steering wheel includes: a communication unit communicating with at least one of the camera and the steering wheel; and a controller transmitting, when a predetermined condition is met, a driving command to a driving unit which applies an external force to move the steering wheel along a predetermined route, receiving a captured image from the camera while the steering wheel is moving, and performing authentication of a driver's face using the image.

The controller may control the driving unit such that the steering wheel is fixed to a predetermined position in accordance with authentication of the driver's face.

The predetermined position may be a position at which at least a part of the driver's face is not covered.

The at least a part of the driver's face may be a part including the driver's eyes.

When the vehicle is started, the controller may transmit the driving command to the driving unit.

When at least a part of the driver's face is covered by the steering wheel at the predetermined position, the controller may control the communication unit so that guidance information for guiding movement of the steering wheel is displayed on a display provided in the vehicle.

Only when the at least a part of the driver's face is a part including eyes, the controller may control the communication unit such that the guidance information is displayed on the display provided in the vehicle.

When at least a part of the driver's face is covered by the steering wheel at the predetermined position, the controller may control the driving unit to move the steering wheel to a position where the at least part of the driver's face is not covered by the steering wheel from the predetermined position.

Only when the at least a part of the eyes is a part including the eyes. the controller may control the driving unit such that the steering wheel moves from the predetermined position to a position where the eyes are not covered.

The controller may control the driving unit such that the steering wheel moves within a predetermined range with respect to the predetermined position.

When the steering wheel is movable in a plurality of directions with respect to the predetermined position, the controller may control the driving unit to move the steering wheel in a direction in which a movement range is minimum.

When the vehicle stops for a predetermined time after the at least a part of the driver's eyes is covered by the steering wheel, the controller may control the driving unit to move the steering wheel from the predetermined position to a position in which the at least a part of the driver's eyes is not covered, while the vehicle is stopped.

When at least a part of the driver's face is covered by the steering wheel at the predetermined position, the controller may control the communication unit such that guidance information for guiding movement of a seat position of the driver's seat is displayed on a display provided in the vehicle.

When at least a part of the driver's face is covered by the steering wheel at the predetermined position, the controller may generate a control command for moving the seat position of the driver's seat such that the at least a part of the driver's face is not covered.

The controller may control the driving unit such that the predetermined route is changed according to a seat position of the driver's seat.

To achieve these and other advantages and in accordance with the purpose of this specification, as embodied and broadly described herein, a method for controlling a vehicle having a camera and a steering wheel includes: when a predetermined condition is met, moving the steering wheel along a predetermined route; and receiving a captured image from the camera while the steering wheel is moving, and performing authentication of a driver's face using the image.

The method may further include: fixing the steering wheel to a predetermined position according to authentication of the driver's face.

The predetermined position may be a position at which at least a part of the driver's face is not covered.

The method may further include: when the at least a part of the driver's face is covered by the steering wheel, displaying guidance information for guiding movement of the steering wheel on a display provided in the vehicle.

The method may further include: when the at least a part of the driver's face is covered by the steering wheel, moving the steering wheel from the predetermined position to a position at which the at least a part of the driver's face is not covered.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
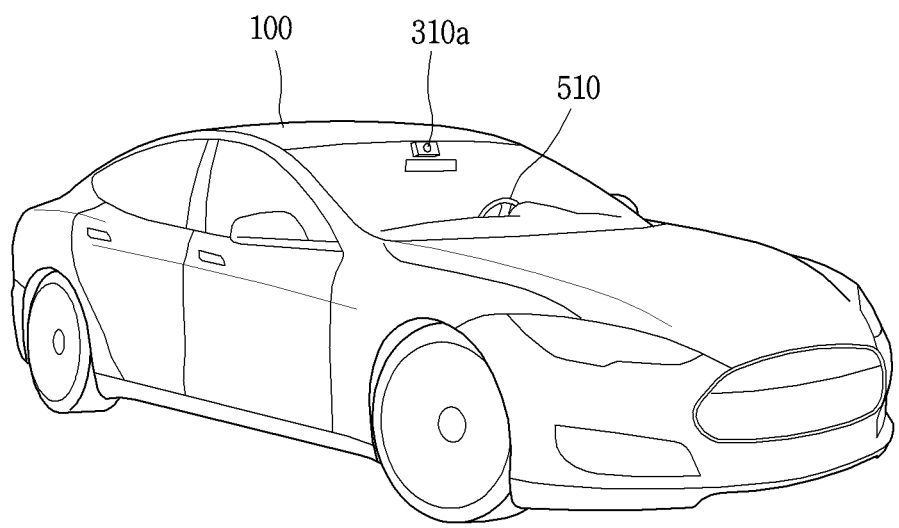
FIG. 1 is a view illustrating an appearance of a vehicle according to an embodiment of the present disclosure.
Figure 1:
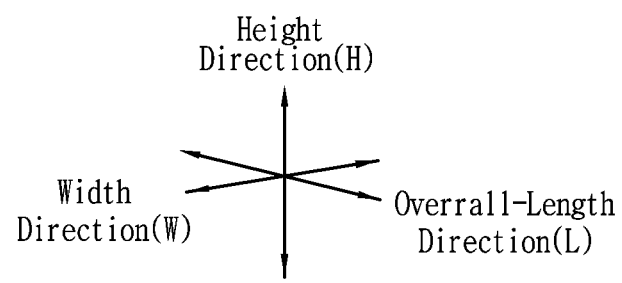

FIG. 1 is a view illustrating appearance of a vehicle in accordance with an embodiment of the present invention.

Figure 2:
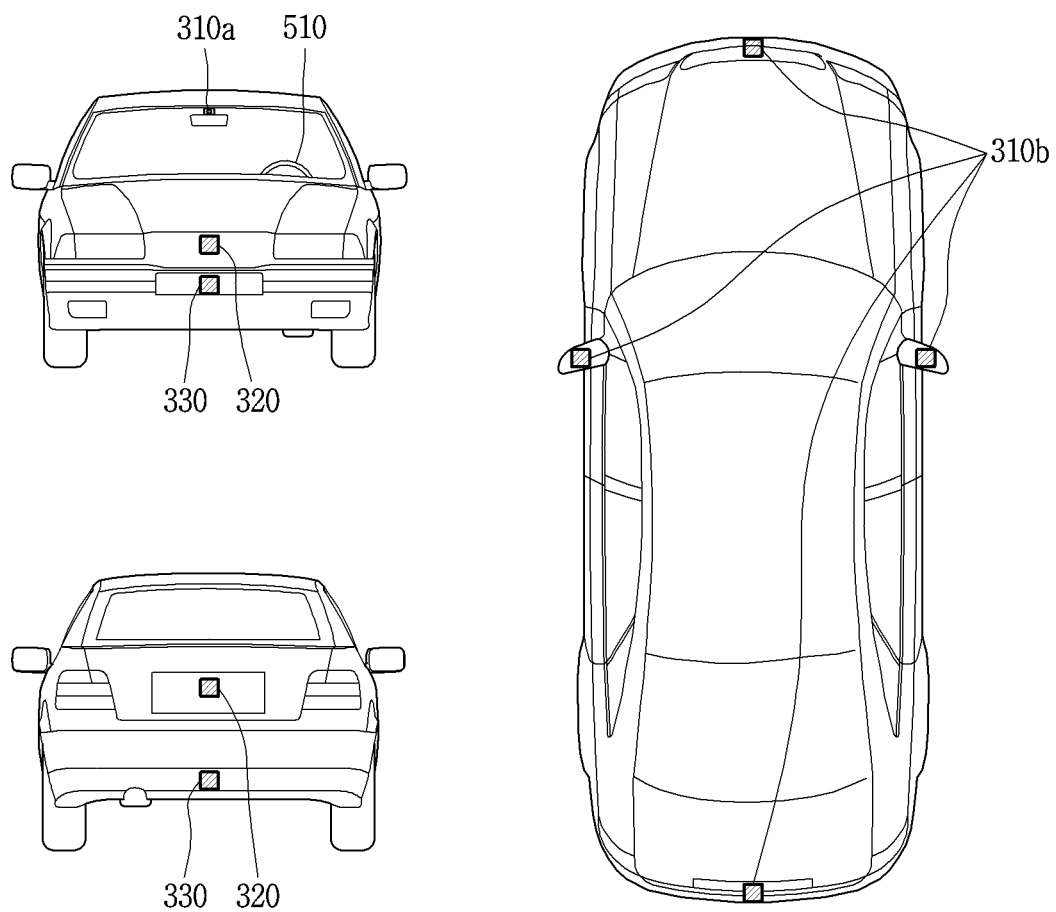
FIG. 2 is a view illustrating a vehicle according to an embodiment of the present disclosure viewed at various angles.

FIG. 2 is a view illustrating appearance of a vehicle at various angles in accordance with an embodiment of the present invention.

Figure 3:
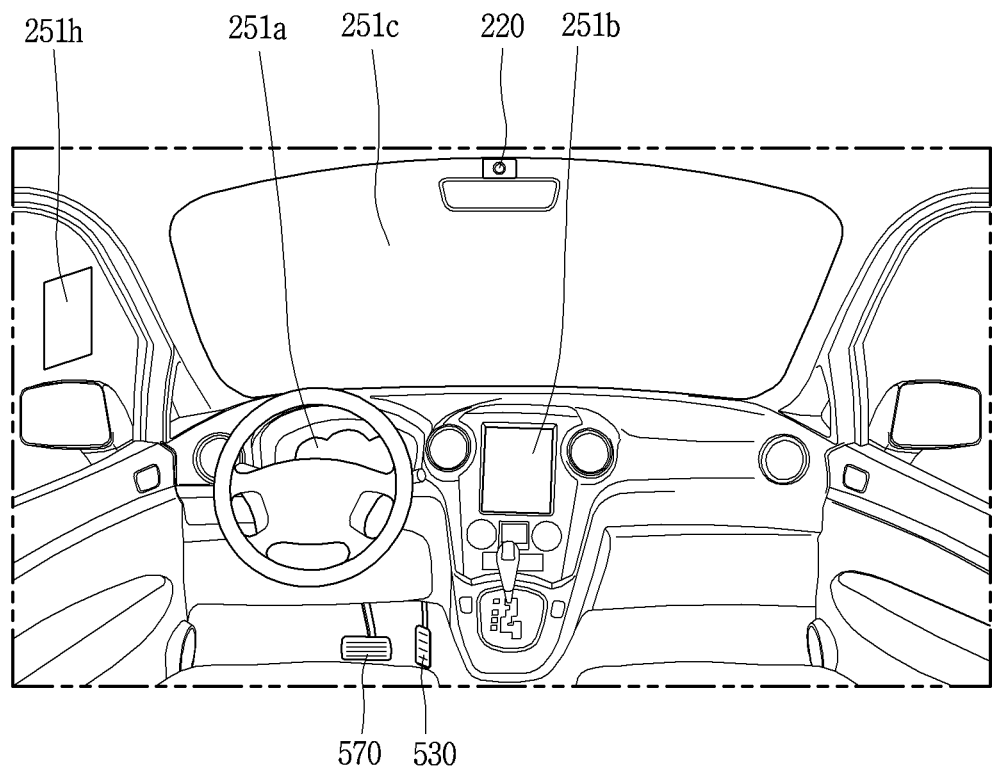
FIGS. 3 and 4 are views illustrating the inside of a vehicle according to an embodiment of the present disclosure.
Figure 4:
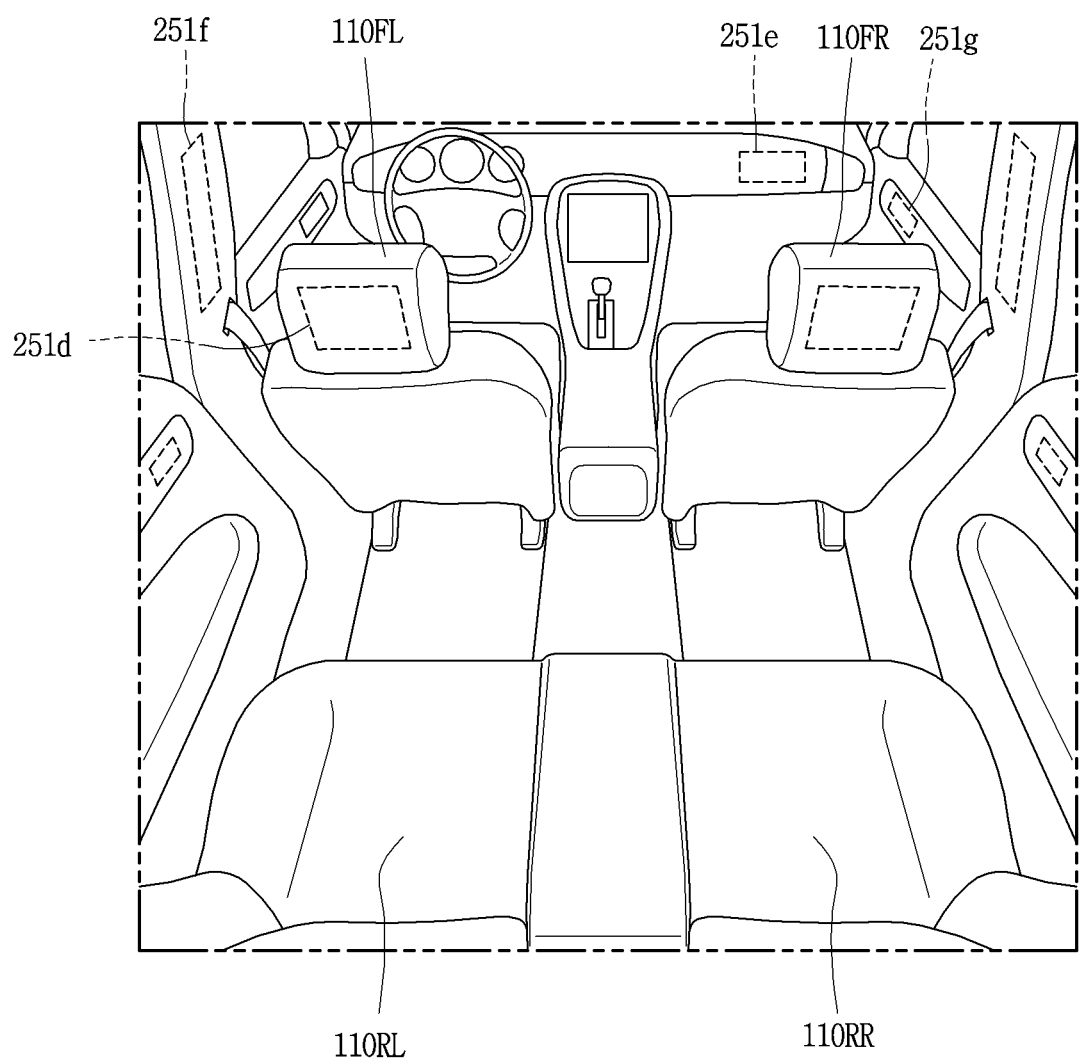

FIGS. 3 and 4 are views illustrating an inside of a vehicle in accordance with an embodiment of the present invention.

Figure 5:
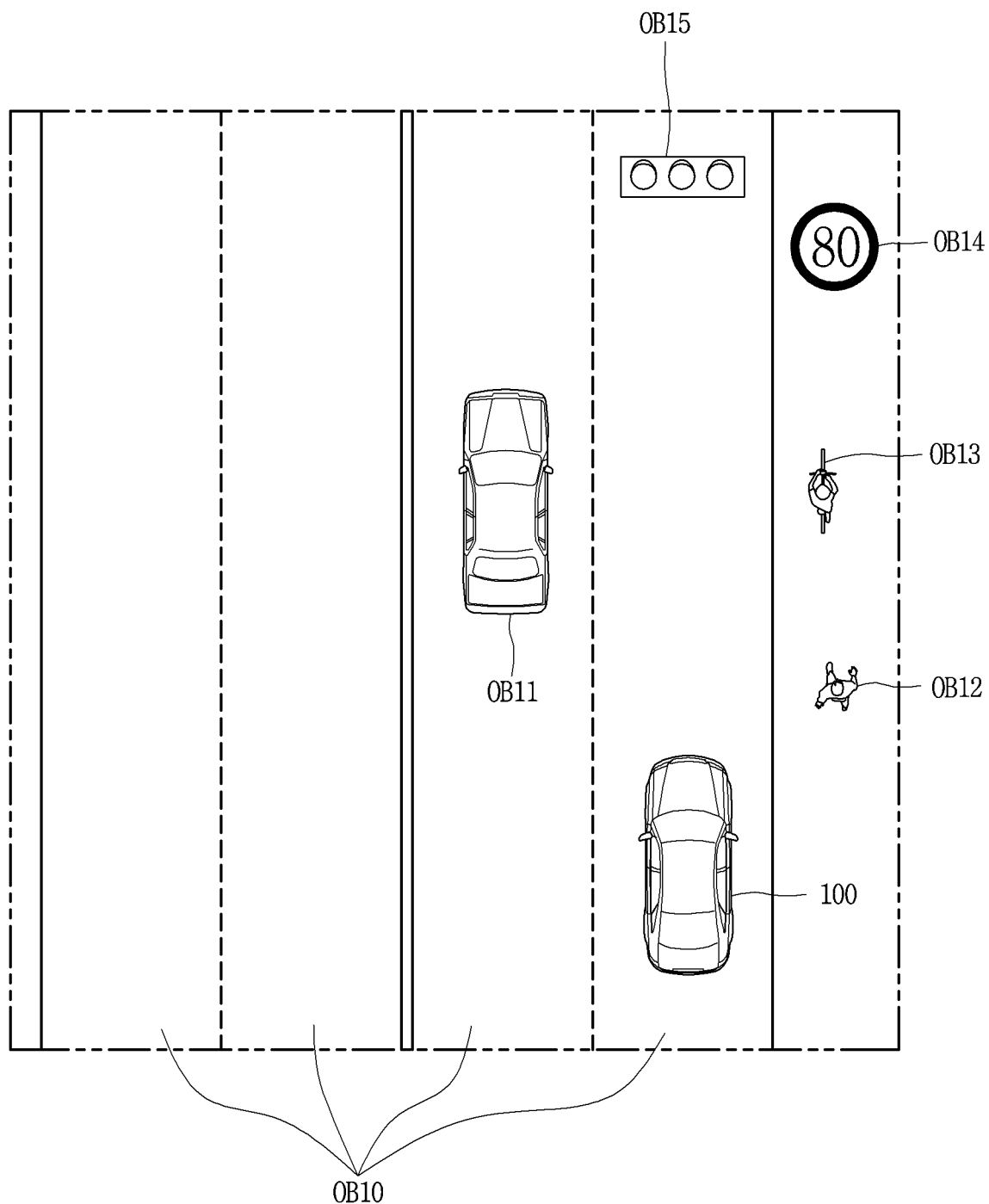
FIGS. 5 and 6 are views referred to in explaining an object according to an embodiment of the present disclosure.
Figure 6:
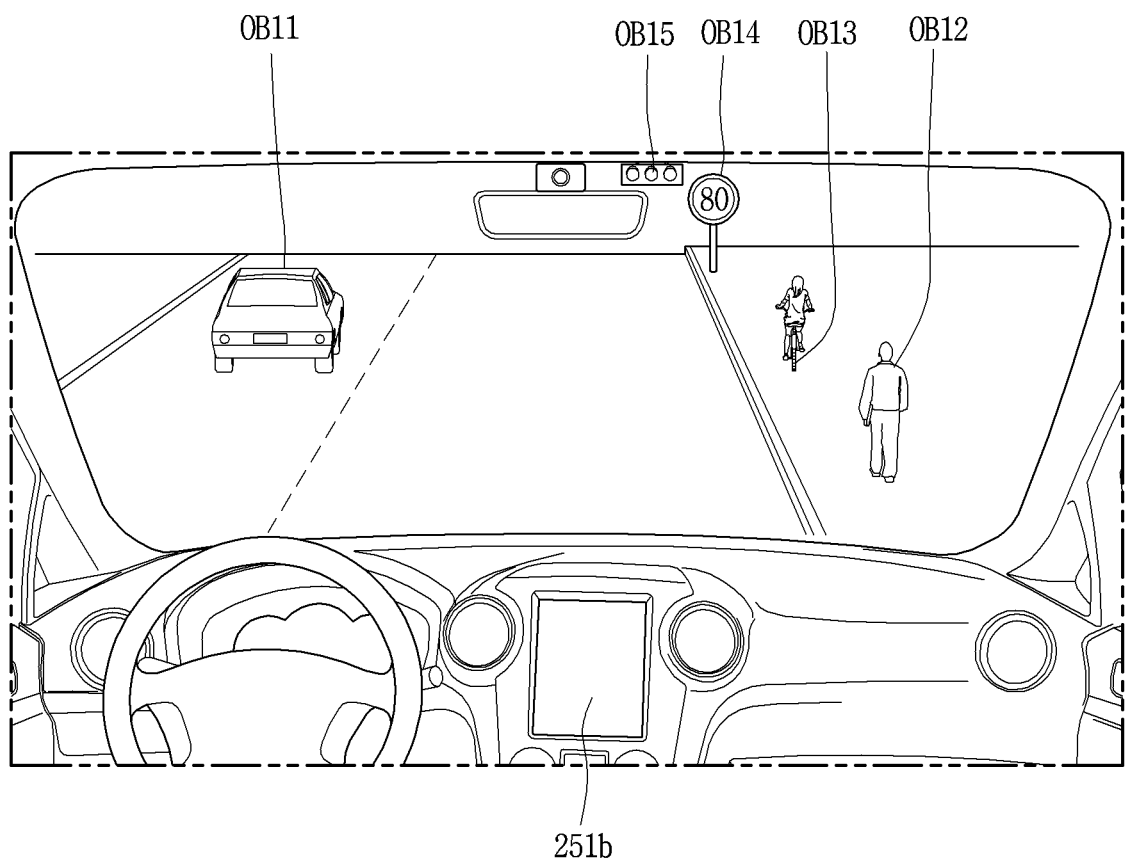

FIGS. 5 and 6 are reference views illustrating objects in accordance with an embodiment of the present invention.

Figure 7:
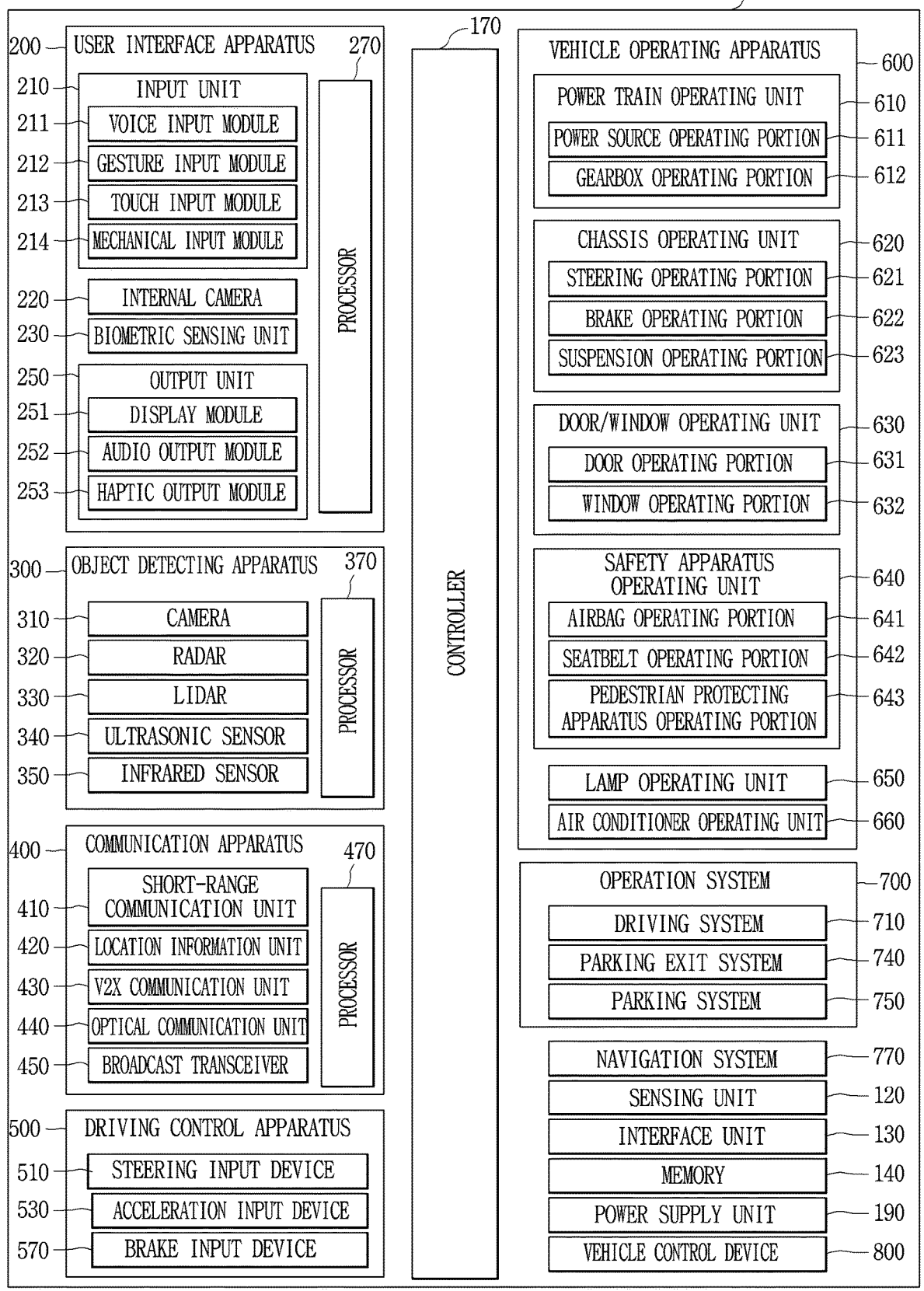
FIG. 7 is a block diagram referred to in explaining a vehicle according to an embodiment of the present disclosure.

FIG. 7 is a block diagram illustrating a vehicle in accordance with an embodiment of the present invention As illustrated in FIG. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD).

When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), W-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking to the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 related to the present disclosure may include a vehicle control device 800.

The vehicle control device 800 may control at least one of the components described above with reference to FIG. 7. In this point of view, the vehicle control device 800 may be the controller 170.

However, without being limited thereto, the vehicle control device 800 may be a separate component independent from the controller 170. When the vehicle control device 800 is implemented as a component independent from the controller 170, the vehicle control device 800 may be provided in a portion of the vehicle 100.

Hereinafter, for the purposes of description, it is assumed that the vehicle control device 800 is a separate component independent from the controller 170. Functions (operations) and control method described with respect to the vehicle control device 800 may be performed by the controller 170 of a vehicle. That is, all contents described in relation to the vehicle control device 800 may also be inferred and applied to the controller 170 in the same or similar manner.

Also, the vehicle control device 800 described in this disclosure may include the components described above with reference to FIG. 7 and some of various components provided in the vehicle. In this disclosure, for the purposes of description, the components described above with reference to FIG. 7 and some of various components provided in the vehicle will be given separate names and reference numerals and described accordingly.

Hereinafter, a vehicle control device and a method for controlling a vehicle according to an embodiment of the present disclosure will be will be described in detail with reference to the accompanying drawings.

Figure 8:
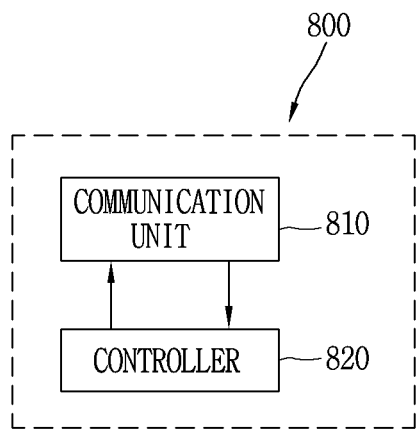
FIG. 8 is a block diagram illustrating an embodiment of a vehicle control device according to the present disclosure.

FIG. 8 is a block diagram illustrating an embodiment of a vehicle control device according to the present disclosure.

Referring to FIG. 8, a vehicle control device 800 according to the present disclosure is a vehicle control device controlling a vehicle 100 having a camera and a steering wheel and includes a communication unit 810 and a controller 810.

The communication unit 810 is configured to perform communication with at least one of the camera and the steering wheel.

At this time, the camera may image a driver (image the driver's seat), and may be disposed at various positions in one or a plurality of positions. For example, the camera may be placed in a cluster on the driver's side to capture the driver's face.

When a predetermined condition is met, the controller 820 transmits a driving command to a driving unit that applies an external force so that the steering wheel moves along a predetermined route, receive an image captured while the steering wheel is moved, from the camera, and perform authentication on the driver's face using the image.

The predetermined condition may include a case where the vehicle 100 is started or an autonomous driving is started, a case where a driver's face is not detected for a predetermined period of time or longer during driver monitoring, and the like.

The predetermined route may be the entirety of a portion of a route in which the steering wheel may move and may be set to be different depending on a seat position of the driver's seat, the driver's body information, or the like.

In an embodiment, when the vehicle 100 is started, the steering wheel may move up and down in a vertical direction in a reciprocating manner in the entire route.

Thus, while the steering wheel is moving along the route in various manners, it is possible to receive an image of the driver (toward the driver's seat) captured by the at least one camera. Then, authentication on the driver's face may be performed using this image.

The image captured by the driver may include an image in which the entire face of the driver is detected, an image in which all or part of the driver's face is covered by the steering wheel, and the like.

Through some of the images, for example, an image in which the entire face of the driver is detected or the image in which a portion of the face excluding an eye region is covered by the steering wheel, the driver may be identified (or determined).

In addition, through these images, it is possible to determine whether or not the face of a specific driver is covered by the steering wheel, in consideration of the seat position of the driver's seat and the position of the steering wheel.

Then, a position of the steering wheel covering (or not covering) the face of each driver according to seat positions may be calculated and corresponding information may be stored in the memory.

Meanwhile, the steering wheel may be fixed to a predetermined position according to the driver face authentication result.

Figure 9:
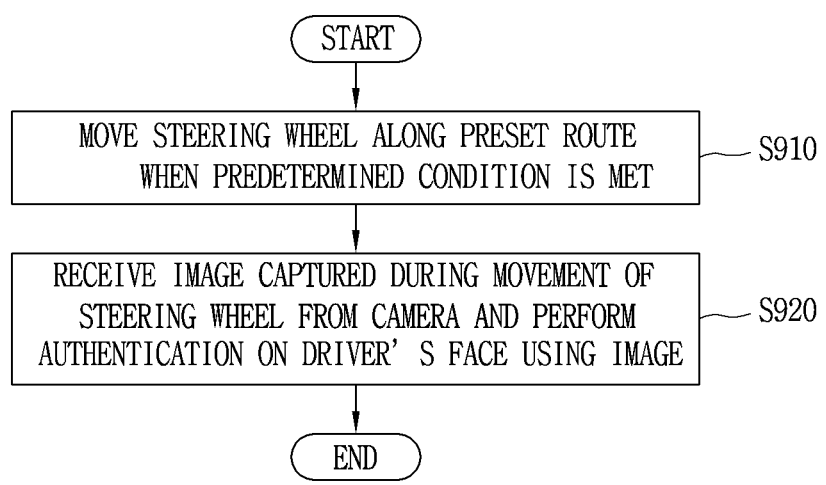
FIG. 9 is a flow chart illustrating an embodiment of a method for controlling a vehicle according to the present disclosure.

In an embodiment, the predetermined position is an area for optimally performing face detection, authentication and monitoring of the driver, and may be a position where at least a part of the driver's face is not covered. Specifically, the steering wheel may be fixed to a position where the eyes of the driver's face are not covered. FIG. 9 is a flow chart illustrating an embodiment of a method for controlling a vehicle according to the present disclosure.

Referring to FIG. 9, according to a method of controlling a vehicle having a camera and a steering wheel, when a predetermined condition is met, the steering wheel is moved along a predetermined route (S910).

Thereafter, an image captured while the steering wheel is moving is received from the camera and authentication on the driver's face is performed using the image (S920).

As described above, the predetermined condition may include a case where the vehicle 100 is started or autonomous traveling starts, a case where the driver's face is not detected for a predetermined time or more during driver monitoring, and the like.

The predetermined route may be set to be different depending on the seat position of the driver's seat, the driver's body information, or the like, as a whole or a part of the route on which the steering wheel may be moved.

In a specific example, when the driver is started, the steering wheel is reciprocated in a vertical direction. During the movement, the camera disposed in the cluster of the driver's seat captures the driver's face and can identify (authenticate) who the driver is through the captured image.

In addition, through these images, it is possible to determine whether or not the face of a specific driver is covered by the steering wheel, taking into consideration the seat position of the driver's seat and the position of the steering wheel.

Then, the driver can calculate the position of the steering wheel that the face is covered (not covered) according to the seat position, and the corresponding information may be stored in the memory.

After the step S920, step of fixing the steering wheel to a predetermined position may be further performed in accordance with the driver face authentication result.

At this time, the predetermined position may be a position (first position) where at least a part of the driver's face (e.g., the eyes, etc.) is not covered.

That is, the first position may be a region for optimally performing face detection, authentication, and monitoring of the driver.

In another embodiment, if at least a part of the driver's face is covered by the steering wheel at the predetermined position (second position), step of displaying guidance information for guiding movement of the steering wheel on a display provided in the vehicle 100 may be further performed.

In this case, the second position may be a preset position or a position calculated as an optimal position in consideration of the seat position of the driver's seat, the driver's body condition, and the like.

When the steering wheel is fixed to this second position, at least a part of the driver's face may be covered by the steering wheel, unlike in the first position.

Accordingly, guidance information for indicating that the steering wheel needs to be moved may be displayed on the display of the vehicle 100. For example, a position to which the steering wheel is to be moved and a movement process of the steering wheel may be shown as animation, a 3D effect, or an augmented reality. Alternatively, a guidance message indicating that movement is necessary may be output as a voice.

In another embodiment, in case where at least a part of the driver's face is covered by the steering wheel at the predetermined position (the second position or another position), step of moving the steering wheel from the predetermined position to a position where at least the part of the driver's face is not partially covered may be further performed.

That is, in addition to outputting guidance information, the steering wheel may be directly moved to an optimal position for detecting, authenticating, and monitoring the driver's face.

Meanwhile, the controller 820 may control the driving unit to fix the steering wheel at the predetermined position according to authentication of the driver's face.

In an embodiment, the predetermined position may be a position where at least a part of the driver's face is not covered. At this time, the at least part of the driver's face may be a part including the eyes of the driver.

In another embodiment, the controller may transmit the driving command to the driving unit when the vehicle is started.

Figure 10:
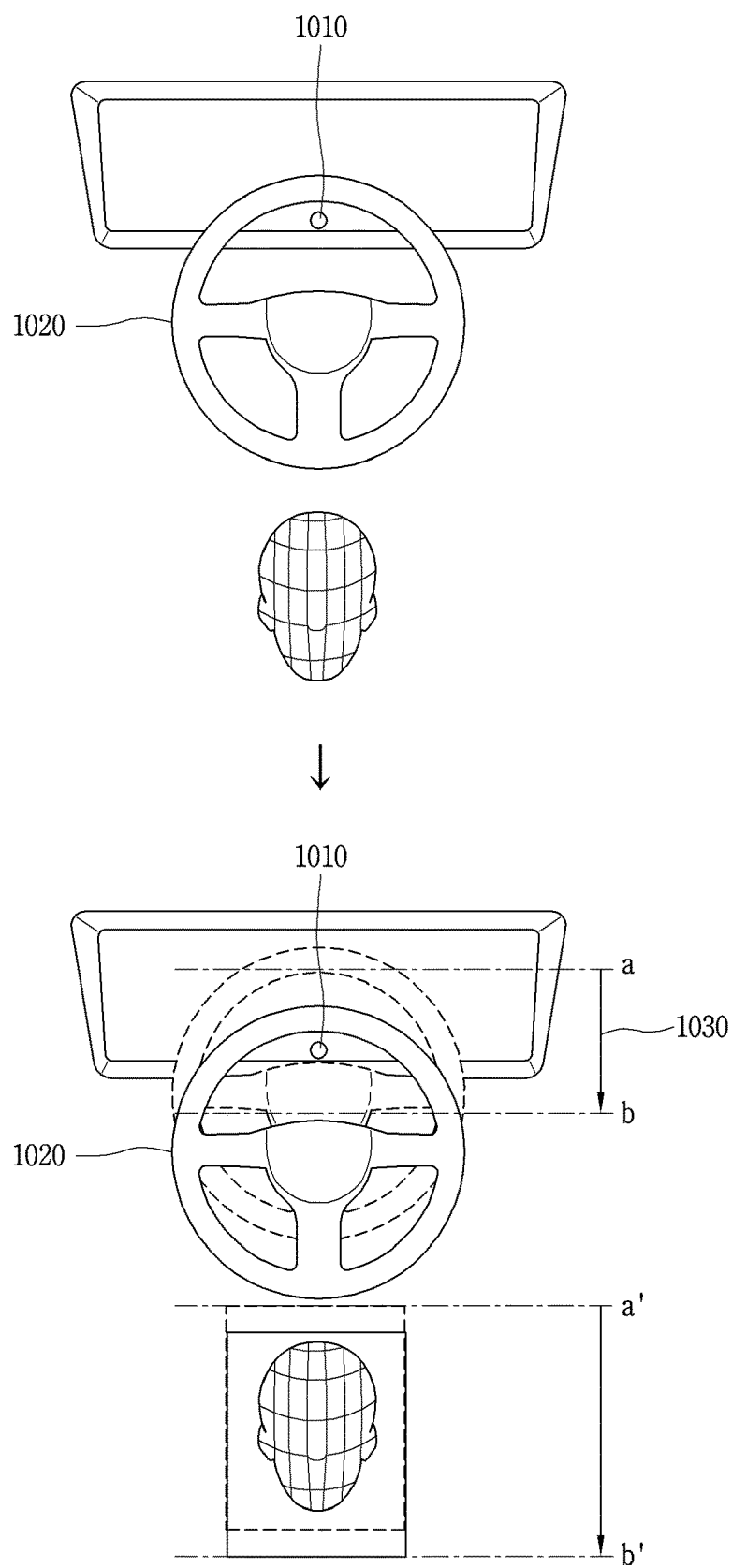
FIG. 10 is a conceptual view illustrating an embodiment in which a driver's face is detected from an image captured during movement of a steering wheel.

FIG. 10 is a conceptual view illustrating an embodiment in which a driver's face is detected from an image captured during movement of a steering wheel.

Referring to FIG. 10, a camera 1010 for capturing an image of the driver and a steering wheel 1020 may be disposed in a cluster of a driver's seat.

In an embodiment, when the driver starts the vehicle, the steering wheel 1020 may move along the movable route 1030, from top to bottom, or from bottom to top. During the movement, the camera 1010 can capture an image of the driver (capture an image of the driver's seat) at predetermined time intervals.

At this time, a plurality of cameras may be disposed in the cluster of the driver's seat or another position, and the steering wheel 1020 may be moved along a different route depending on a seat position of a driver's seat, a driver's physical condition, and the like. Details related thereto will be described later.

In this manner, it is possible to detect a region in which the driver's face may be detected, authenticated, and monitored, from the image of the driver. Also, it is possible to identify (authenticate) the driver.

In detail, the steering wheel 1020 can move from top to bottom along a movable route 1030, and through an image of the driver's face from a' to b' captured by the camera 1010, the driver may be identified.

That is, an image in which a part of the driver's face is not covered by the steering wheel 1020 is detected from the image from a' to b', and the driver may be identified from the detected image.

Further, a position (range) of the steering wheel 1020 in which at least a part of the driver's face is not covered may be calculated from the detected image. The calculated position may be varied according to the seat position of the driver's seat, and thus, it may be stored together with the seat position information of the driver's seat.

Thereafter, the steering wheel 1020 may be fixed to the first position. The first position, which is an optimal region for detecting, authenticating and monitoring the driver's face, may be a position in which at least a part of the driver's face is not covered. For example, the first position may be a region in which the eyes of the driver are not covered.

On the other hand, instead of the entire face of the driver, a part, e.g., eyes, may be detected to perform the authentication procedure.

Figure 11:
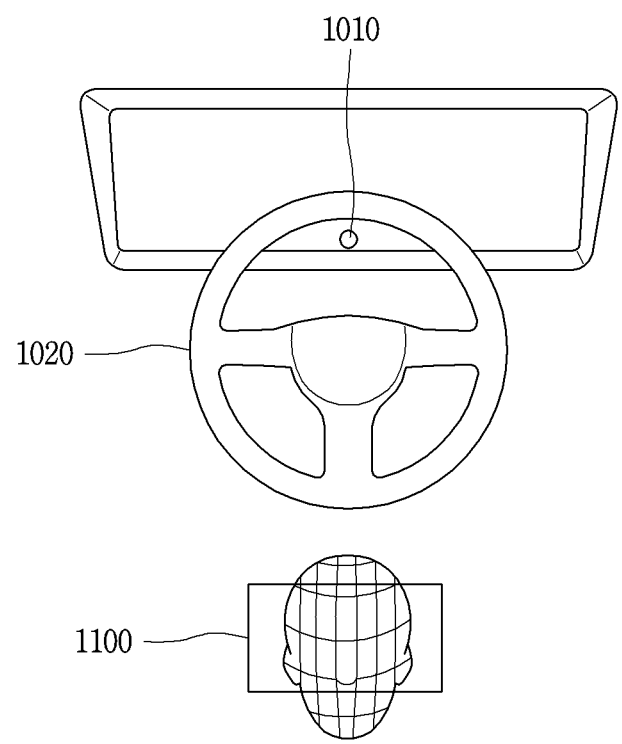
FIG. 11 is a conceptual view illustrating an embodiment in which driver's eyes are detected from an image captured during movement of a steering wheel.

FIG. 11 is a conceptual view illustrating an embodiment in which the driver's eyes are detected from an image captured during movement of a steering wheel.

Referring to FIG. 11, when the vehicle 100 is started, the steering wheel 1020 can move along a route that may be moved from top to bottom or from bottom to top.

A region 1100 including the eyes of the driver may be detected from the image captured by the camera 1010 while the steering wheel 1200 is moving.

In an embodiment, when the eye region 1100 is not detected, the function of monitoring the driver may be turned off.

In another embodiment, when the eye region 1100 is detected, it may be determined whether iris authentication is possible. If the iris information has not been previously registered, it may be newly registered, and in the case of previously registered iris information, the driver may be authenticated through the iris information.

In another embodiment, when the iris authentication of a specific driver is completed, the driver may be partially monitored. That is, only a function of tracking the driver's face position using the eye position may be used.

In another embodiment, the position (range) of the steering wheel 1020 in which the eye region 1100 of the driver's face is not covered may be calculated. The calculated position may be varied according to seat positions of the driver's seat, and thus it may be stored together with the seat position information of the driver's seat.

Particularly, such detection of the driver's face may be implemented so that a driver may be monitored by securing a partial region of the face when the vehicle has a structure in which driver face authentication is impossible in a camera view.

When at least a part of the driver's face is covered by the steering wheel at the predetermined position, the controller 820 may control the communication unit 810 such that guidance information for guiding movement of the steering wheel is displayed on a display provided in the vehicle.

In an embodiment, the controller 820 may control the communication unit 810 so that the guidance information is displayed on a display provided in the vehicle, only when the at least a part of the driver's face is a part including eyes.

Figure 12:
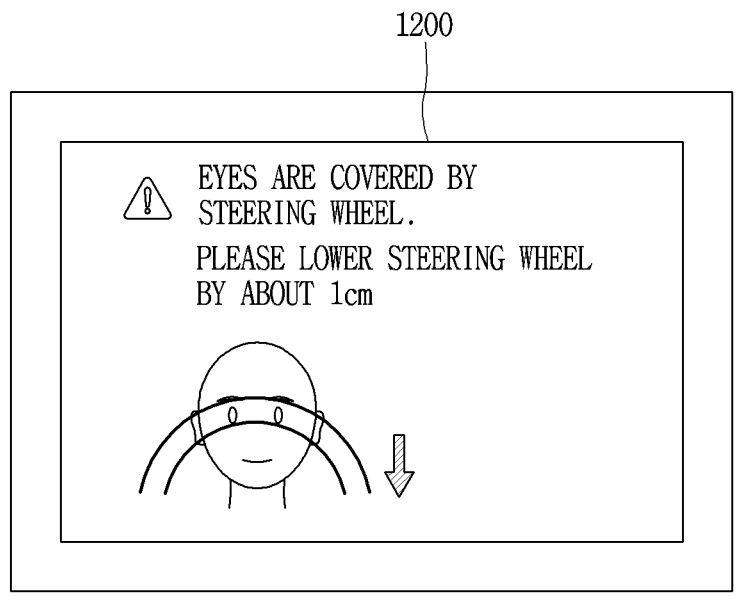
FIG. 12 is a conceptual view illustrating an embodiment in which guide information of a steering wheel is output.

FIG. 12 is a conceptual view illustrating an embodiment in which guide information of a steering wheel is output.

Referring to FIG. 12, a message 1200 indicating that the driver's eyes are covered by the steering wheel may be output on an video display device of the vehicle 100.

Then, a message suggesting movement of the steering wheel may be output.

For example, a message suggesting lowering the steering wheel by about 1 cm may be output.

Thus, the driver can directly lower the steering wheel. Alternatively, if the driver agrees on the suggestion message, the steering wheel may be lowered by about 1 cm.

In an embodiment, the driver may indicate that he agrees or disagrees on the suggestion message by a voice or a specific gesture (when a specific touch input is applied to the steering wheel).

In another embodiment, when the driver does not agree on movement of the steering wheel, a driver monitoring function and a 3D cluster implementation function may be automatically switched to an OFF state.

Meanwhile, when at least a part of the driver's face is covered by the steering wheel at the predetermined position, the controller 820 may control the driving unit to move the steering wheel from the predetermined position to a position where the at least a part of the driver's face is not covered by the steering wheel.

In an embodiment, the controller 820 may control the driving unit so that the steering wheel moves from the predetermined position to a position where the eyes are not covered, only when the at least part of the driver's face is at least a part including the eyes.

Here, the controller 820 may control the driving unit to move the steering wheel within a predetermined range based on the predetermined position.

In another embodiment, when the steering wheel is movable in a plurality of directions with respect to the predetermined position, the controller 820 may control the driving unit to move the steering wheel in a direction in which the moving range is the minimum.

Figure 13:
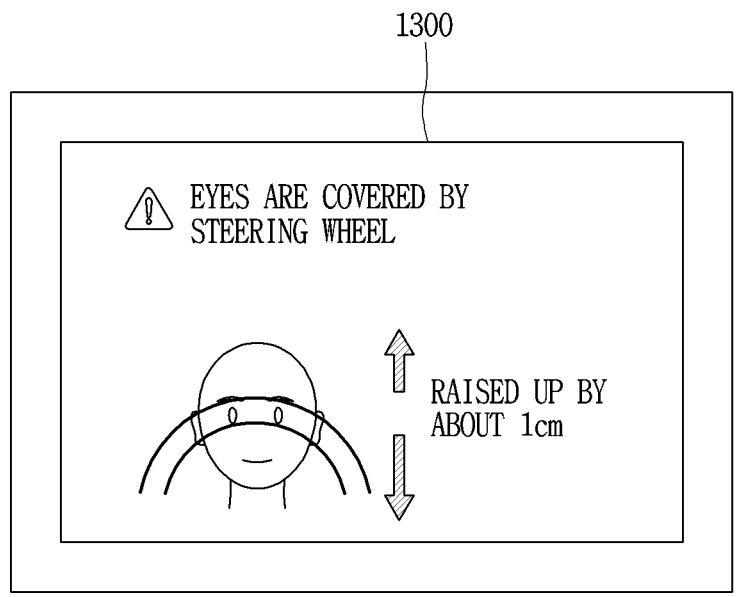
FIG. 13 is a conceptual view illustrating an embodiment in which a steering wheel is moved.

FIG. 13 is a conceptual view illustrating an embodiment in which a steering wheel is moved.

Referring to FIG. 13, a message 1300 indicating that the driver's eyes are covered by the steering wheel may be output on the video display device of the vehicle 100. Also, a message indicating the movement of the steering wheel may be output.

In an embodiment, as described above with reference to FIG. 12, after the message suggesting movement is shown for a predetermined time, the steering wheel may be moved.

Alternatively, the steering wheel may be moved together with the output of the message. The embodiment of FIG. 12 or 13 may be determined according to A setting of the driver. For example, if the driver preferentially sets the monitoring function or the 3D cluster function, the steering wheel may be moved together with the guidance message (or after the driver approves one more time).

In another embodiment, in order to minimize a risk that may occur when the steering wheel is changed, movement of the steering wheel may be limited to be changed within a predetermined range with respect to a current position.

In detail, the steering wheel may be limited to be movable up and down within a range of 1 cm. If a change beyond the above range is required, the steering wheel may be limited to be changed while vehicle 100 is stopped.

Similarly, in order to minimize a risk that may occur when the steering wheel is changed, a direction in which the steering wheel may move within a minimum range, among a plurality of directions in which the steering wheel is movable based on the current position, may be selected and the steering wheel may be moved therein.

In detail, when the eyes are covered by the steering wheel, the eyes may not be covered if the steering wheel is raised up by about 1 cm or lowered down by about 4 cm. Accordingly, the movement direction and the range of the steering wheel may be set so as to ascend by about 1 cm above as movement within the minimum range.

As described above, the steering wheel is moved at a predetermined position, and if the steering wheel is moved while driving, a dangerous situation may occur.

Accordingly, when the vehicle 100 stops for a predetermined time after the at least a part of the driver's eyes is covered by the steering wheel, the controller 820 may control the driving unit to move the steering wheel from the predetermined position to a position in which the at least a part of the driver's eyes is not covered by the steering wheel, while the vehicle is stopped.

Figure 14:
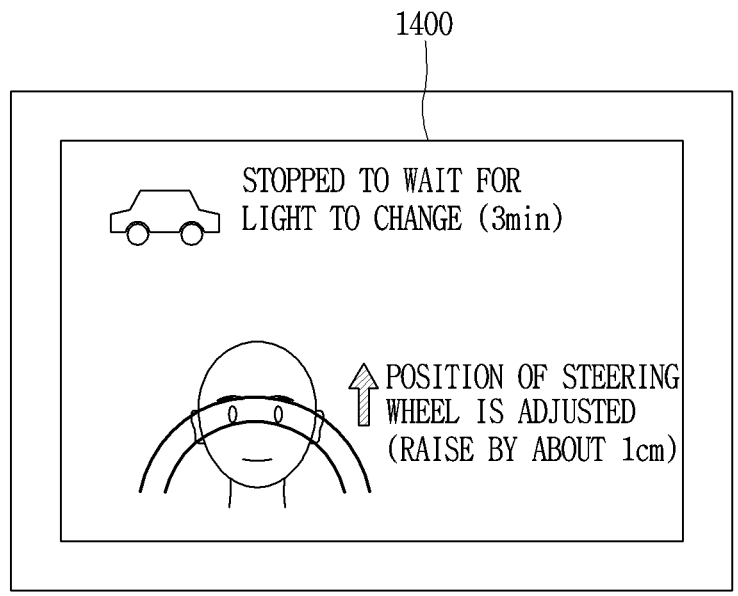
FIG. 14 is a conceptual view illustrating an embodiment in which a steering wheel is moved while a vehicle is stopped.

FIG. 14 is a conceptual view illustrating an embodiment in which a steering wheel is moved while a vehicle is stopped.

Referring to FIG. 14, a message 1400 indicating that the steering wheel is moved is output on the video display device of the vehicle 100 as the vehicle is stopped to wait for the light to change, and the steering wheel may be moved.

In an embodiment, it may be confirmed that the driver's eyes are not covered when the steering wheel is raised by about 1 cm upward or lowered by about 4 cm downward.

Accordingly, when the vehicle 100 is stopped for a predetermined time, for example, when the vehicle is stopped for three minutes to wait for the signal, a message indicating it and a message indicating that the position of the steering wheel is to be adjusted may be output. Additionally, or alternatively, when the vehicle 100 is stopped, the steering wheel may be raised up by about 1 cm.

In another example, when the stopping time is sufficiently long, the driver can directly set a movement direction and a range of the steering wheel.

When at least a part of the driver's face is covered by the steering wheel at the predetermined position, the controller 820 may control the communication unit 810 such that guidance information for guiding movement of the seat position of the driver's seat is displayed on the display provided in the vehicle 100.

The seat position of the driver's seat may include a height of the driver's seat, an angle of a backrest, an angle of a head part, a distance to the cluster, and the like.

Figure 15:
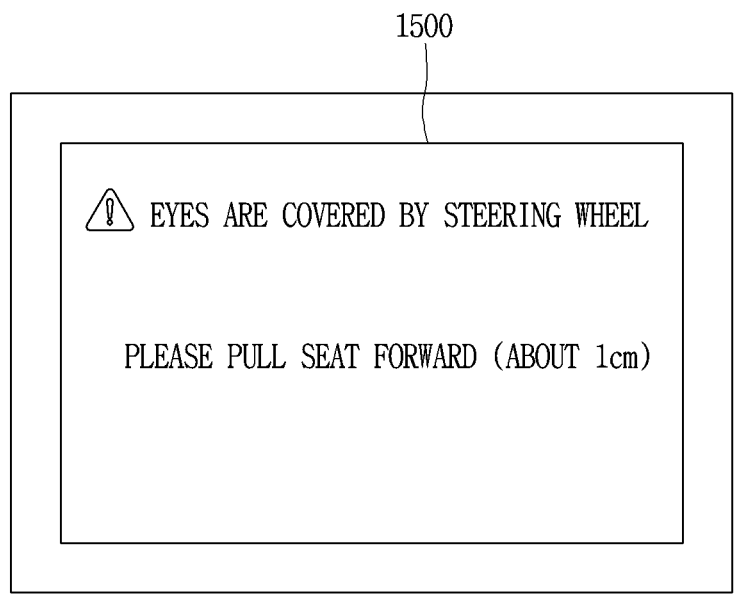
FIG. 15 is a conceptual view illustrating an embodiment in which guide information of a seat position is output.

FIG. 15 is a conceptual view illustrating an embodiment in which guide information of a seat position is output.

Referring to FIG. 15, a message 1500 indicating that the driver's eyes are covered by the steering wheel may be output on the video display device of the vehicle 100.

Then, a message suggesting a change in the seat position of the driver's seat may be output. For example, a message suggesting that the seat position of the driver's seat should be pulled forward to a predetermined degree may be output.

Accordingly, the driver can directly pull the seat forward. Alternatively, if the driver agrees on the suggestion message, the seat position may be moved forward.

In an embodiment, the driver may indicate that he agrees or disagrees on the suggestion message by a voice or a specific gesture.

In another embodiment, if the driver does not agree on the change in the seat position, the driver monitoring function and the 3D cluster implementation function may be automatically switched to an OFF state.

In another embodiment, changing the driver's seat position may be considered as a secondary alternative in case where driver monitoring fails even after the steering wheel has been moved or if the driver does not want to move the steering wheel.

Meanwhile, when at least a part of the driver's face is covered by the steering wheel at the predetermined position, the controller 820 may generate a control command for moving the seat position of the driver's seat so that at least the part of the driver's face may not be covered by the steering wheel.

Figure 16:
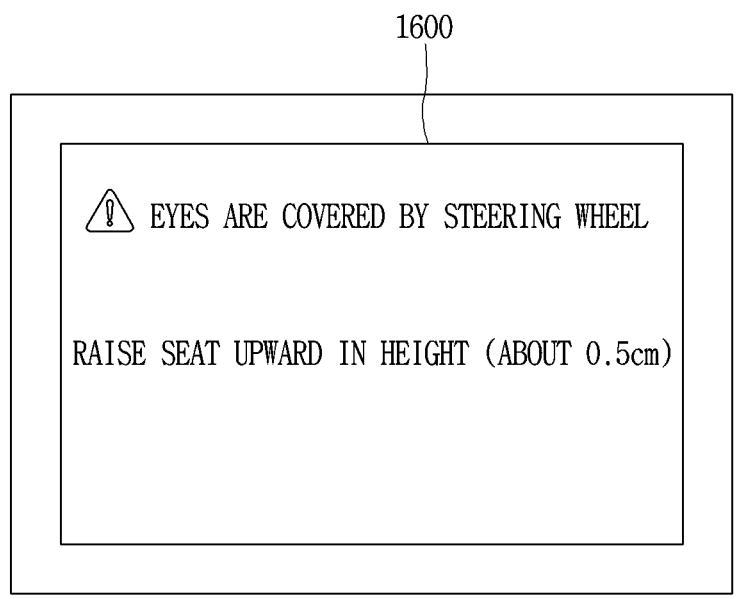
FIG. 16 is a conceptual view illustrating an embodiment in which a seat position is changed.

FIG. 16 is a conceptual view illustrating an embodiment in which a seat position is changed.

Referring to FIG. 16, a message 1600 indicating that the driver's eyes are covered by the steering wheel may be output on the video display device of the vehicle 100. Then, a message indicating movement (change) of the driver's seat may be output.

In an embodiment, as described above with reference to FIG. 15, the driver's seat may be moved after a message suggesting movement is shown for a predetermined time.

Alternatively, the seat position of the driver's seat may be changed along with the output of the message. The embodiment of FIG. 15 or 16 may be determined according to a setting of the driver. For example, if the driver first sets the monitoring function or the 3D cluster function, the seat position of the driver's seat may be moved together with a guidance message (or after the driver approves it one more time).

In another embodiment, in order to minimize a risk that may occur when the seat position of the driver's seat is changed, movement of the seat position may be limited to be changed within a predetermined range with respect to a current position.

In detail, the seat position may be limited to be movable up and down within a range of 1 cm. If a change beyond the above range is required, the seat position may be limited to be changed while vehicle 100 is stopped.

Similarly, in order to minimize a risk that may occur when the seat position is changed, a direction in which the seat position may move within a minimum range, among a plurality of directions in which the seat position is movable based on the current position, may be selected and the seat position may be moved therein.

In detail, when the eyes are covered by the steering wheel, the eyes may not be covered if the seat position is raised up by about 1 cm or lowered down by about 4 cm. Accordingly, the movement direction and the range of the seat may be set so as to ascend by about 1 cm above as movement within the minimum range.

As described above, the seat position is moved at a predetermined position, and if the seat position is changed while driving, a dangerous situation may occur.

Accordingly, when the vehicle 100 stops for a predetermined time after the at least a part of the driver's eyes is covered by the steering wheel, the controller 820 may change the seat position, while the vehicle is stopped.

In an embodiment, a message 1400 indicating that the seat position is moved is output on the video display device of the vehicle 100 as the vehicle is stopped to wait for the light to change, and the steering wheel may be moved.

In an embodiment, it may be confirmed that the driver's eyes are not covered when the backrest is raised by about 5° upward or lowered by about 10° downward.

Accordingly, when the vehicle 100 is stopped for a predetermined time, for example, when the vehicle is stopped for three minutes to wait for the signal, a message indicating it and a message indicating that the seat position is adjusted may be output. Also, when the vehicle 100 is stopped, the backrest may be raised up by about 5°.

In another example, when the stopping time is sufficiently long, the driver can directly set a movement direction and a range of the seat position.

Meanwhile, the controller 820 may control the driving unit to change a predetermined route according to the seat position of the driver's seat.

In an embodiment, when a seat height of the driver's seat, a distance to the cluster, and an angle of the backrest or a head rest are different, a range in which at least a part of the driver's face is covered by the steering wheel may vary.

Figure 17:
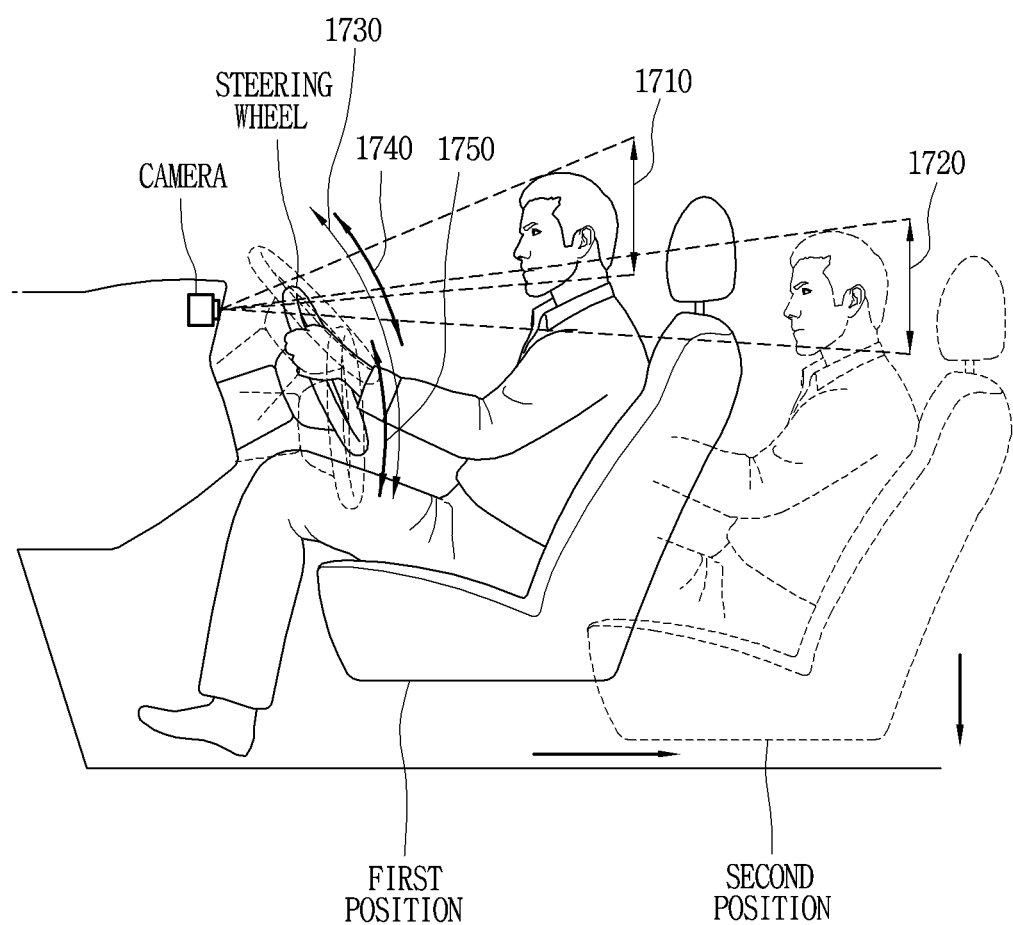
FIG. 17 is a conceptual view illustrating an embodiment in which a movement route of a steering wheel is changed according to a seat position.

FIG. 17 is a conceptual view illustrating an embodiment in which a movement route of a steering wheel is changed according to a seat position.

Referring to FIG. 17, when the seat height is changed from a first position to a second position, a region in which the driver's face is detected is changed. Accordingly, a range in which a part of the driver's face is covered by the steering wheel is also changed. At this time, a body condition of the driver (sitting height, eye position, etc.) may be considered.

In an embodiment, if the seat height is fixed to the first position, the driver's face may be detected in the first range 1710. Accordingly, a movable range of the steering wheel in which the steering wheel does not cover the first range 1710 may be calculated.

In a following embodiment, when the seat height is lowered to the second position, the range in which the driver's face is detected may be changed by the lowered seat height. That is, the driver's face may be detected in the second range 1720. In addition, a movable range of the steering wheel in which the steering wheel does not cover does not cover the second range 1720 may be calculated.

According to the present disclosure, the driver is authenticated through the image captured while the steering wheel is moving, and a movable range of the steering wheel in which the driver's face is not covered is calculated.

Referring to FIG. 17, the driver face detectable sections 1710 and 1720 may be calculated according to seat heights, driver's body conditions, and the like. Therefore, a range of movement of the steering wheel may be adjusted to such a degree that a range covering the ranges 1710 and 1720 is calculated.

In detail, at the time of initial starting, the steering wheel may be moved up and down along an entire movable route 1730. Thereafter, in case where the vehicle is started again later, since the driver face detectable section is known according to a current seat height, there is no need to move the entire route 1730.

For example, if the seat height is the first position, the steering wheel may reciprocate in the first section 1740. On the other hand, if the seat height is the second position, the steering wheel can reciprocate in the second section 1750.

Effects of the vehicle control device provided in a vehicle and the method for controlling a vehicle according to the present disclosure will be described as follows.

According to at least one of the embodiments of the present disclosure, by capturing an image while the steering wheel is moving, a region in which the driver's face is covered by the steering wheel may be accurately calculated.

Further, by considering the driver's body condition and the seat position of the driver's seat, the steering wheel or the seat may be changed within a minimum range for a minimum time.

In another example, by changing the steering wheel or the seat while the vehicle is stopped, the risk that may occur during driving may be minimized.

Also, a range of movement of the steering wheel may be set to a minimum range in consideration of the seat position of the driver's seat, or the like, at the time of initial starting.

The present disclosure described above may be implemented as a computer-readable code in a medium in which a program is recorded. The computer-readable medium includes any type of recording device in which data that may be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device for controlling a vehicle comprising a camera, a steering wheel, and a driving system connected to the steering wheel and configured to move the steering wheel, the vehicle control device comprising:
 a communication device coupled with a controller of the vehicle control device, and configured to communicate with the camera and the steering wheel;
 at least one processor; and
 a computer-readable medium coupled to the at least one processor having stored thereon instructions which, when executed by the at least one processor, causes the at least one processor to perform operations comprising:
  determining that a first condition is met;
  based on the determination that the first condition is met, moving, through the driving system, the steering wheel along a first path;
  acquiring, through the camera, a plurality of images captured during the moving of the steering wheel along the first path;
  authenticating a face of a driver of the vehicle based on the acquired plurality of images,
  based on the authentication of the face of the driver, determining a first position of the steering wheel;
  moving, through the driving system, the steering wheel to the first position;
  moving, through the driving system, the steering wheel to a second position where at least a portion of the face of the driver is visible to the camera;
  determining at least two steering wheel positions where at least a portion of the face is visible to the camera; and
  determining one of the at least two steering wheel positions that is the closest to the first position to be the second position,
  wherein moving the steering wheel to the second position comprises:
   determining that the vehicle is to be stationary for a first time period, and
   based on the determination that the vehicle is to be stationary for the first time period, moving the steering wheel to the second position.

2. The vehicle control device of claim 1, wherein determining the first position of the steering wheel comprises:
 based on the plurality of images, selecting a first image comprising at least a portion of the face of the driver; and
 determining a position of the steering wheel corresponding to the first image to be the first position.

3. The vehicle control device of claim 2, wherein the at least a portion of the face of the driver comprises eyes of the driver.

4. The vehicle control device of claim 3, wherein moving the steering wheel to the first position comprises:
 determining that the vehicle has been started; and
 based on the determination that the vehicle has been started, moving the steering wheel to the first position.

5. The vehicle control device of claim 1, wherein the operations comprise:
 determining that at least a portion of the face of the driver is not visible to the camera when the steering wheel is positioned at the first position; and
 displaying, through a display of the vehicle, steering wheel guidance information configured to guide a movement of the steering wheel.

6. The vehicle control device of claim 5, wherein the at least a portion of the face of the driver comprises eyes of the driver.

7. The vehicle control device of claim 1, wherein the operations comprise:
 determining that at least a portion of the face of the driver is not visible to the camera when the steering wheel is positioned at the first position.

8. The vehicle control device of claim 7, wherein the at least a portion of the face of the driver comprises eyes of the driver.

9. The vehicle control device of claim 1, wherein the operations comprise:
 determining that at least a portion of the face of the driver is not visible to the camera when the steering wheel is positioned at the first position; and
 displaying, through a display of the vehicle, seat guidance information configured to guide an adjustment of a position of a seat of the driver.

10. The vehicle control device of claim 1, wherein the vehicle further comprises a seat driving unit configured to adjust a position of a seat of the driver, and wherein the operations comprise:
 determining that at least a portion of the face of the driver is not visible to the camera when the steering wheel is positioned at the first position; and
 adjusting, through the seat driving unit, the position of the seat of the driver to a first seat position where the at least a portion of the face is visible to the camera.

11. The vehicle control device of claim 1, wherein the operations comprise:
 modifying the first path of the steering wheel based on a seat position of a seat of the driver.

12. The vehicle control device of claim 1, wherein determining that the first condition is met comprises one or more of:
 determining that the vehicle has been started;
 determining that an autonomous driving of the vehicle has started; and
 determining that the face of the driver has not been visible to the camera for a second time period.

13. A method for controlling a vehicle comprising a camera, a steering wheel, and a driving system connected to the steering wheel and configured to move the steering wheel, the method comprising:
 determining that a first condition is met;
 based on the determination that the first condition is met, moving, through the driving system, the steering wheel along a first path;
 acquiring, through the camera, a plurality of images captured during the moving of the steering wheel along the first path;
 authenticating a face of a driver of the vehicle based on the acquired plurality of images;
 based on the authentication of the face of the driver, determining a first position of the steering wheel;
 moving, through the driving system, the steering wheel to the first position;
 moving, through the driving system, the steering wheel to a second position where at least a portion of the face of the driver is visible to the camera;

determining at least two steering wheel positions where at least a portion of the face is visible to the camera; and determining one of the at least two steering wheel positions that is the closest to the first position to be the second position, wherein moving the steering wheel to the second position comprises:

determining that the vehicle is to be stationary for a first time period, and based on the determination that the vehicle is to be stationary for the first time period, moving the steering wheel to the second position.

14. The method of claim 13, further comprising:

based on the authentication of the face of the driver, determining a first position of the steering wheel; and moving, through the driving unit, the steering wheel to the first position.

15. The method of claim 14, wherein:

based on the plurality of images, selecting a first image comprising at least a portion of the face of the driver; and determining a position of the steering wheel corresponding to the first image to be the first position.

16. The method of claim 14, further comprising:

determining that at least a portion of the face of the driver is not visible to the camera when the steering wheel is positioned at the first position; and displaying, through a display of the vehicle, steering wheel guidance information configured to guide a movement of the steering wheel.

* * * * *